3,296,170
EMULSION POLYMERIZATION OF ETHYLENE
Richard D. Burkhart, South Charleston, and Nathan L. Zutty, Charleston, W. Va., assignors to Union Carbide Corporation, a corporation of New York
No Drawing. Filed Apr. 3, 1963, Ser. No. 270,174
11 Claims. (Cl. 260—29.6)

The present invention relates to the emulsion polymerization of ethylene. More specifically the present invention relates to ethylene homopolymer emulsions and ethylene copolymer emulsions which are composed of finely dispersed, spherical resin particles and which are characterized by high resin content and exceptionally long lasting stability; to methods of preparing said emulsions; and to particulate, relatively spherical, high molecular weight ethylene polymer separated from said emulsions.

In the past, there have been two general methods for producing high molecular weight polyethylene emulsions. The first method has been to disperse pulverulent or friable polyethylene in water with the aid of an emulsifying agent. This process has not been found to be commercially favorable in the case of high molecular weight polyethylene, as it involves many steps to prepare, and the emulsion obtained is limited by low resin content of relatively low emulsion stability. The second method proposed has been the direct formation of polyethylene emulsion by the polymerization of ethylene in an aqueous media in the presence of a water soluble polymerization catalyst. This second method has also been modified by the inclusion of emulsifying agents in the reaction mixture. These emulsifying agents directly affect the characteristics of the polyethylene particles formed and the emulsion of which they are a part.

Various emulsifying agents and emulsifying systems have been proposed. For example, a process for polymerizing olefinic materials has been proposed wherein a hydrocarbon sodium sulfonate is used as an emulsifying agent; an ethylene polymerization process has been disclosed wherein a number of emulsifying agents such as sulfonates, sulfated alcohols, quaternary ammonium halides and similar materials are proposed and a process for polymerizing ethylene in an aqueous emulsion has been disclosed wherein it is proposed to utilize both a cationic and a non-ionic emulsifying agent.

While the prior art emulsifier systems have been many and varied, they have been deficient in several respects: In all of these systems the emulsion produced has had a relatively low resin content and even with this low resin content the emulsions have not generally been stable for long periods of time, such as a year, thus making them unsuitable where a long period of storage has been contemplated.

Attempts to overcome these deficiencies have generally been directed to the polyethylene emulsion per se, by adding additional emulsifying agents and by agitating stored emulsions prior to shipment to increase shelf life, or by evaporating the water from the emulsion in an attempt to thereby increase the solids content of the emulsion; or by adding finely divided polyethylene to the emulsion for the same purpose. None of these expedients have been found to be satisfactory.

A method has now been found, however, by which ethylene under high pressure can be polymerized in an aqueous media in a manner such that the resultant emulsion has a relatively high resin content, the resin particles are finely divided and spherical in shape, and the emulsion has an exceptional stability in that it will not de-emulsify or "cream" on standing for long periods. In addition, it has been found that through the utilization of the same methods, ethylene copolymer or terpolymer emulsions can be prepared.

It is believed that in the high pressure emulsion polymerization of ethylene the ethylene undergoes polymerization on the site of micelles formed by the surfactants present. These surfactants also stabilize the emulsion after it has formed. It is for this reason that it is necessary to have surfactants present in the emulsion. Surfactants however, vary in their inherent potential to form micelles and maintain their micellar structure at elevated temperatures. Those surfactants having higher potential will form and maintain the micelle at higher temperatures. This potential toward micelle formation can be determined through use of the formula:

$$M.P. = \frac{C_{An} - (O_t + 2C_{Cat})}{I}$$

wherein

M.P.=micelle potential,
$C_{An}$=total number of carbon atoms present in the anion portion of the molecule,
$C_{Cat}$=total number of carbon atoms present in the cationic portion of the molecule,
$O_t$=total number of oxygen atoms present in the entire molecule,
$I$=the number of anions formed if the molecule were completely ionized.

The term "anionic high micelle potential surfactant" as used hereinafter refers to surfactants having a micelle potential of from 10 to 40 inclusive. The term "anionic low micelle potential surfactant" as employed hereinafter refers to surfactants having a micelle potential less than 10.

The deficiencies of the prior art can be avoided when, in accordance with the present invention, ethylene is polymerized in an aqueous media, in the presence of a water-soluble free radical catalyst and a combination of surfactants comprising a low micelle potential, oil soluble, surfactant which is either an anionic surfactant or an oil soluble non-ionic surfactant; and a high micelle potential anionic surfactant having a micelle potential of from 10 to 40 inclusive at a temperature of less than 100° C. It has however, been found preferable to utilize a high micelle potential anionic surfactant having a micelle potential of from 10 to 40 inclusive which has the formula

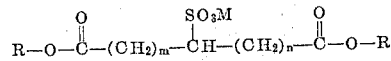

wherein R is an alkyl group containing from 7 to 20 carbon atoms inclusive, $n$ is a digit having a value of from 0 to 3 inclusive, $m$ is a digit having a value of from 1 to 3 inclusive and M is a monovalent cation having a molecular weight of from 2 to 40 inclusive. This preference is dictated by the fact that these high micelle potential surfactants permit a greater latitude of polymerization temperatures. The emulsions of the present invention can be prepared at temperatures of from 50° to 250° C., when using the preferred surfactants. At temperatures in excess of 100° C. the preferred surfactants must be used.

An aqueous ethylene polymer emulsion produced in accordance with the present invention comprises water, an ethylene polymer, a low micelle potential surfactant as defined above, and a high micelle potential surfactant as defined above. Such an emulsion is characterized by a high solids content, by exceptional stability, and ethylene polymer particles which are relatively spherical in shape and which have an average particle diameter of from about .01 to about 2.0 microns.

The ethylene homopolymer emulsions of the present invention contain from about 35 to about 60 percent by weight dispersed polyethyene and yet have exhibited no tendency to cream, de-emulsify, or precipitate out in a period exceeding 18 months.

The ethylene copolymer and terpolymer emulsions of the present invention contain from about 8 to about 60 percent dispersed ethylene copolymer or terpolymer and have exhibited no tendency to cream, de-emulsify, or precipitate out in a period exceeding 12 months.

This high resin content and exceptional stability is believed due to the synergistic action of the high and low micelle potential surfactants.

Each of these surfactants will be discussed in order below.

I. LOW MICELLE POTENTIAL SURFACTANT

The low micelle potential surfactant for use in the present polymerization system is selected from the anionic surfactants containing from 6 to 30 carbon atoms inclusive and which are substantially insoluble in water, i.e. less than 20%. These surfactants vary considerably in their chemical structure but may be classified by derivation generally as follows:

CARBOXYLIC ACID (1) Wherein the carboxyl group is joined directly to the hydrophobic group such as the fatty acid soaps, rosin soaps, tall oil soaps, and the like.

(2) Wherein the carboxyl group is joined to the hydrophobic group through an intermediate linkage. Illustrative of such linkages are amide groups, ester groups, sulfonamide groups, sulfide groups, sulfoxy groups, and the like.

SULFURIC ACID ESTERS (1) Wherein the sulfate group is joined directly to the hydrophobic group, and which may contain other polar groups.

(2) Wherein the sulfate group is joined through an intermediary linkage. Illustrative of such linkages are ester groups, amide groups, ether groups, and the like.

ALKANE SULFONIC ACIDS (1) Wherein the sulfonic group is directly linked to the hydrophobic alkane group, and (2) Wherein the sulfonic group is connected to the hydrophobic portion of the molecule through an intermediary linkage. Illustrative of such intermediary linkages are the ester groups, the amides groups, the ether groups, and the like.

ALKYLAROMATIC SULFONIC ACIDS (1) Wherein the hydrophobic alkyl group is joined directly to the sulfonated aromatic nucleus and (2) Wherein the hydrophobic group is attached to the sulfonated aromatic nucleus through an intermediate linkage. Illustrative of such linkages are the ester groups, the amide groups, the imide groups, the ether groups, the heterocyclic groups and the like.

Other suitable anionic surfactant types are the:
(1) Sulfonamides,
(2) Sulfamic acid derivatives,
(3) Phosphates.

The foregoing classes of surfactants are all known and recognized in the art as surfactants. As stated previously, those which can be used in the present invention are those which are substantially water insoluble, i.e., oil soluble, but which can be readily dispersed in water and which contain from about 6 to about 30 carbon atoms.

The preferred low micelle potential anionic surfactants are the amine salts of the alkyl aryl sulfonates containing from 12 to 30 carbon atoms inclusive such as isopropylammonium dodecylbenzenesulfonate, diisopropylammonium tridecylbenzenesulfonate, or the like; and the amine salts of alkyl sulfates such as diisopropylammonium stearylsulfate, diisopropylammonium cetylsulfate or the like. The low micelle potential anionic surfactant can be effectively substituted by certain non-ionic surfactants. The non-ionic surfactants which can be used in the present invention in place of the low micelle potential anionic surfactants are the alkylpolyethyleneglycol ethers of the formula:

$$R^2(OH_2CH_2)_yOH$$

wherein $R^2$ is a monovalent aliphatic hydrocarbon radical containing from 10 to 20 carbon atoms inclusive such as decyl, undecyl, dodecyl, tridecyl, tetradecyl and the like, and $y$ is an integer having a value of from 1 to 6 inclusive.

II. HIGH MICELLE POTENTIAL SURFACTANT

The high micelle potential surfactants useful in the present invention must be anionic surfactants and can be of the general chemical types described under low molecular weight anonic surfactants.

As noted above, however it has been found desirable to use anionic surfactants of the formula:

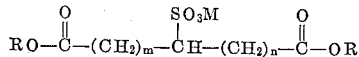

wherein M is a monovalent cation having a molecular weight of from 2 to 40 inclusive, for example, the alkali metal cations such as lithium, sodium and potassium, or ions such as ammonium, R is an alkyl group containing from 7 to 20 carbon atoms inclusive, $m$ is a digit having a value of from 1 to 3 inclusive and $n$ is a digit having a value of from 0 to 3 inclusive. The use of such surfactants produces stable emulsions of particularly high resin content. The anionic high micelle potential surfactant is selected through the use of different criteria than is the low micelle potential surfactant. This surfactant must have a micelle potential of from 10 to 40 inclusive.

Selection of a specific high micelle potential surfactant is made in respect to the temperature at which the polymerization is to be conducted. If the temperature is in excess of 100° C. then an anionic surfactant of the formula above having a micelle potential greater than 20 and preferably from 20 to 40 must be used. If the polymerization reaction is to be conducted at a temperature of less than 100° C. then any anionic surfactant having a micelle potential of less than 40 can be used but preferably one having a micelle potential of from 10 to 19 inclusive.

Illustrative of typical anionic surfactants and their micelle potentials are:

TABLE I.—HIGH MICELLE POTENTIAL SURFACTANTS

Surfactant:                                              Micelle potential
   Sodium salt of heneicosanoic acid _____ 19
   Isopropylamine salt of pentadecylbenzene-
     sulfonate _____ 12
   Sodium bis(tridecyl)sulfosuccinate _____ 23
   Sodium bis(octyl)sulfosuccinate _____ 13
   Sodium stearate _____ 16
   Sodium tetradecyl sulfate _____ 10

TABLE II.—SUBSTANTIALLY WATER INSOLUBLE LOW MICELLE POTENTIAL SURFACTANTS

Sulfactant:                                              Micelle potential
   Isopropylamine salt of dodecylsulfate _____ 2
   Diisopropylamine salt of pentadecylbenzene-
     sulfonate _____ 6
   Isopropylamine salt of dodecylbenzenesulfonic
     acid _____ 9

Particularly preferred high micelle potential surfactants are the bis(alkyl)sulfosuccinate monovalent salts having the formula:

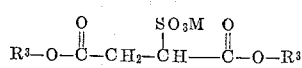

wherein each $R^3$ is an alkyl group containing from 7 to 20 carbon atoms inclusive such as heptyl, octyl, nonyl, decyl, undecyl, dodecyl, tridecyl, tetradecyl, pentadecyl, hexadecyl and the like, and M has been previously defined. The bis(alkyl)sulfosuccinate salts are preferred because they produce emulsions of particularly high resin content and stability.

The surfactant system is generally composed of a ratio of from about 0.5:1 to about 2.5:1 parts low micelle potential surfactant to high micelle potential surfactant. However, it has been found that a ratio of 1.5:1 produces an emulsion of high resin content and maximum stability and is therefore preferred.

The surfactant system is generally used in an amount of from about 0.5 percent to about 10 percent by weight based upon the weight of water used in the reaction media. It has, however, been found preferable to use from about 2 percent to about 7 percent based by weight upon the water used as the product emulsion formed has been found to have high resin content and high stability.

The polymerization of ethylene as described above is carried out in the presence of a water soluble free radical type catalyst or mixture thereof.

Included within the term "water soluble free radical catalyst" are the water soluble azo compounds such as 2,2'-diguanyl-2,2'-azopropane, and the like; hydroperoxides such as tert-butyl hydroperoxide, and the like; and the inorganic peroxides and perborates such as urea peroxide, potassium persulfate, hydrogen peroxide, sodium pyrophosphate peroxide, sodium perborate or potassium perborate, or the like. However, the chemical nature of the catalyst is not critical in this invention as long as it is water-soluble and generates free radicals at the reaction temperature selected. Catalytic amounts are normally employed i.e., from about 0.01 to about 3.0 percent by weight of monomer charged although for most purposes amounts from about 0.1 to about 1.0 are preferred for optimum results.

Ethylene is homopolymerized in accordance with the present invention at a temperature of from about 50° to about 250° C. It is preferred, however, to conduct this polymerization at a temperature of from about 60° C. to about 190° C. as emulsions of higher resin content are produced in this temperature range.

Ethylene homopolymerization is conducted generally at a pressure of from about 8,000 to about 50,000 pounds per square inch. A pressure of from about 10,000 to about 40,000 pounds per square inch, however, has been found to be preferable as a maximum yield is obtained without the necessity of using excessively high pressure.

Ethylene is generally used in a ratio of from about 1:1 to 5:1 based on the weight of water used in the reaction media. A ratio of 1.5:1 ethylene to water is however, preferred as an emulsion of maximum resin content is produced.

It has also been found that ethylene can be copolymerized with non-aromatic mono-olefinically unsaturated monomers or with polymerizable non-aromatic cycloaliphatic compounds.

Illustrative of said non-aromatic, mono-olefinically unsaturated monomers which can be emulsion copolymerized with ethylene in accordance with the present invention are the vinyl and vinylidene halides such as vinyl chloride, vinyl fluoride, vinylidene chloride, vinylidene bromide and the like; vinyl esters such as vinyl formate, vinyl acetate, vinyl propionate, vinyl butyrate, vinyl chloroacetate, vinylchloropropionate, and the like; acrylic and alpha-alkyl acrylic acids, their amides, and their nitriles such as acrylic acid, chloroacrylic acid, methacrylic acid, ethacrylic acid, methyl acrylate, ethyl acrylate, butyl acrylate, n-octyl acrylate, 2-ethylhexl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethylmethacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinyl pyrrolidone, ethyl methylene malonate and the like; and polymerizable cycloolefins such as bicyclo [2.2.1]hept-2-ene, bicyclo[2.2.2]oct-2-ene, their 5-substituted compounds and the like.

Illustrative of said polymerizable cycloaliphatic compounds containing more than one vinyl group are the following: bicyclo[2.2.1]hepta-2,5-diene, bicyclo[2.2.2] octa-2,5-diene and the like.

In addition, terpolymers from ethylene and two other of the above-mentioned monomers can be prepared. Terpolymers of particular interest include ethylene/vinyl chloride/acrylic acid terpolymer and the ethylene/vinyl acetate/acrylic acid terpolymer.

It should be noted that aromatic monomers such as olefinically unsaturated benzene derivatives inhibit the polymerization reaction and therefore cannot be used as comonomers in the present invention.

The copolymerization reaction is conducted in a similar manner using similar amounts of reactants, and similar reaction conditions as described above for the homopolymerization of ethylene except for the reaction temperature.

The copolymerization reaction is generally conducted at a temperature of from 50° C. to 150° C. and preferably at a temperature of from 60° C. to 100° C. The narrow range is preferable because emulsions of higher resin content and greater stability are generally obtained within this range.

The copolymerization reaction is generally conducted at a pressure of from about 1000 to about 50,000 pounds per square inch absolute and preferably from about 3000 to about 30,000 pounds per square inch absolute.

Other additives such as dyes, pigments, fillers, stabilizers, or the like may be incorporated into the reaction mixture provided they do not interfere with the reaction. Such additives may also be added to the product emulsion provided they do not effect separation of the resin.

If it is desired to precipitate the resin from the product emulsion, this can be readily effected by the addition of metal salts such as aluminum sulfate and calcium chloride, or other methods well known to those skilled in the art. For obvious reasons when it is not desired to precipitate the resin of the emulsion, the inclusion of such metal salts should be carefully avoided.

The finely divided ethylene polymer can be recovered from the ethylene polymer emulsion by precipitating the polymer as described above and separating the precipitate by filtration or by spray drying the latex. The particulate ethylene polymer is, as described above, relatively spherical in shape and has an average particle diameter of from 0.01 to 2.0 microns. These polymer particulates are useful in specialized coating techniques wherein fine particle size is desirable such as in flame coating and in fluidized bed coating.

While applicants do not intend to be bound by any particular theory of mechanisms concerning the polymerization of the present invention, it is believed that there exists a micelle dependency.

It is postulated that surfactants form micelles, or groups of molecules bound by their hydrophobic attraction. The ethylene (and co-monomer if used) is believed to saturate this micelle. Excess monomer forms droplets in the aqueous media. Polymerization is believed to occur in the micelle which is continuously replenished from the monomer droplets of the media. Micelle formation and stability is believed to be temperature dependent and for this reason, only surfactants having certain properties (combined in the term micelle potential) will exist or function as micelles at temperatures above 60° C. In the present invention this is the function of the surfactant which has been termed the high micelle potential surfactant. The use of this surfactant promotes exceptionally high yields of polymer, the particles of which are small and spherical in shape.

If the high micelle potential surfactant is used alone without the low micelle potential surfactant, the resin precipitates and cannot be emulsified by the subsequent addition of other surfactants.

However, the inclusion of the surfactant which has been termed the low micelle potential surfactant in the reaction media causes the newly formed resin particles to remain in emulsion as they form. It is believed that the interaction of the two surfactants effects the long term stability which characterizes these emulsions either directly or indirectly in the formation of the fine, uniform, spherical particles.

The emulsions of the present invention are useful as components in coating compositions such as water base paints, polishes and the like.

The examples which follow are illustrative of the present invention. Unless otherwise indicated all parts and percentages are by weight. The following standard test methods were employed in determining the properties of the polymers:

*Melt index* was determined in accordance with A.S.T.M. D1238–57T.

*Density* was determined in accordance with A.S.T.M. D1505–60T.

*Stiffness modulus* was determined in accordance with A.S.T.M. D882–56T.

*Tensile strength* was determined in accordance with A.S.T.M. D882–56T.

*Percent elongation* was determined in accordance with A.S.T.M. D882–56T.

*Example 1*

In order to evaluate the surfactant system of the present invention three emulsion polymerizations were conducted as described below:

A. PREPARATION OF ETHYLENE HOMOPOLYMER EMULSION UTILIZING SOLELY A HIGH MICELLE POTENTIAL ANIONIC SURFACTANT

To a high pressure, stirred autoclave having a 1500 milliliter capacity there were charged 921 grams of distilled water, 77 grams of a 5 percent aqueous solution of sodium bis(tridecyl)sulfosuccinate and 1.0 gram of lithium perborate. The autoclave was then sealed and thoroughly purged with high purity nitrogen gas. Ethylene gas was admitted to the autoclave in an amount sufficient to raise the internal pressure of the autoclave to 3500 pounds per square inch. The reaction mixture was then heated to a temperature of 160° C. and ten cubic centimeters by weight aqueous solution of a 20 percent by weight aqueous solution of sodium bisulfite was charged to the reaction with a sufficient amount of additional oxygen-free ethylene to raise the reaction pressure to 15,000 pounds per square inch. The reaction was then conducted at this temperature and pressure for a period of 3.5 hours; at the end of this peiod the autoclave was cooled, the pressure was released and the emulsion was recovered. The product was a fluid polyethylene emulsion having the following characteristic properties:

Weight percent
 total solids _____ 4.85
Melt index of polymer _____decigrams/minute__ 5.56

This reaction yielded 49.1 grams of solid polyethylene in emulsion, which represents a 21 percent conversion of the ethylene monomer.

B. PREPARATION OF ETHYLENE HOMOPOLYMER EMULSION UTILIZING SOLELY A HIGH MICELLE POTENTIAL ANIONIC SURFACTANT

To a high pressure, stirred autoclave having a 1500 milliliter capacity there were charged 924 grams of distilled water, 80 grams of a 5 percent aqueous solution of sodium bis(tridecyl)sulfosuccinate, and 5 grams of a 5 percent solution of tert-butyl hydroperoxide in benzene. The autoclave was then sealed and thoroughly purged with high purity nitrogen gas. Ethylene gas was admitted to the autoclave in an amount sufficient to raise the internal pressure of hte autoclave to 3500 pounds per square inch. The reaction mixture was then heated to a temperature of 155° C., a sufficient additional amount of oxygen-free ethylene was added to raise the reaction pressure to 15,000 pounds per square inch, and the temperature was then raised to 160° C. The reaction was thereafter conducted for a period of 15 minutes, after which period the pressure within the autoclave was reduced to atmospheric pressure, the temperature of the reaction mixture was reduced to room temperature and the autoclave was opened.

The reaction product contained a total of 253 grams of ethylene polymer; 48.8 percent of the polymer was emulsified, the remainder being precipitated. The polyethylene emulsion had the following characteristic properties:

Weight percent
 total solids _____ 8.0
Melt index of polymer _____decigrams/minute__ 3.62

This reaction represents a 46 percent total conversion of ethylene monomer to polymer.

C. PREPARATION OF ETHYLENE HOMOPOLYMER EMULSION UTILIZING BOTH HIGH AND LOW MICELLE POTENTIAL ANIONIC SURFACTANTS IN COMBINATION

The method of Example 1B was repeated except that 4 grams of the isopropyl amine salt of dodecyl benzene sulfonic acid was initially added with the 924 grams of distilled water, the 80 grams of a 5 percent aqueous solution of sodium bis(tridecyl)sulfosuccinate and the 5 grams of a 5 percent solution of tert-butyl hydroperoxide in benzene. The reaction was conducted over a period of 37 minutes.

The polyethylene emulsion produced contained 208 grams of ethylene polymer all of which was in emulsion. The polyethylene emulsion had the following characteristic properties:

Weight percent total solids _____ 17.4
Melt index of polymer _____decigrams/minute__ 1.72

The conversion of monomer to polymer for this reaction was 5 percent. Polymer yield in emulsion was 100%.

This example illustrates the synergistic effect obtained by the use of the combination of high and low micelle potential anionic surfactants in the increased solids content of the emulsion.

*Example 2*

PREPARATION OF ETHYLENE HOMOPOLYMER EMULSION

The method of Example 1C was repeated except that the reaction was conducted at a temperature of 150° C. for a period of 40 minutes.

The polyethylene emulsion produced contained 208 grams of polymer, all of which was in emulsion. The polyethylene emulsion had the following characteristic properties:

Weight percent total solids _____ 27.2
Melt index of polymer _____decigrams/minute__ 2.28

The conversion of monomer to polymer for this reaction was 61.2 percent.

*Example 3*

PREPARATION OF ETHYLENE HOMOPOLYMER EMULSION USING A LOW MICELLE POTENTIAL ANIONIC SURFACTANT HAVING A MICELLE POTENTIAL OF 2 IN COMBINATION WITH A LOW MOLECULAR WEIGHT ANIONIC SURFACTANT HAVING A MICELLE POTENTIAL VALUE OF 9

To a high pressure, stirred autoclave having a 1500 milliliter capacity, were charged 750 grams of distilled water, 3 grams of tetrasodium N-(1,2-dicarboxyethyl)-N-octylsulfosuccinamate, 3 grams of isopropylamine salt of dodecylbenzenesulfonic acid and 2.5 grams of a 5 percent solution of tert-butyl hydroperoxide in benzene. The autoclave was then sealed, thoroughly purged with high purity nitrogen, and heated to a temperature of 135° C. Ethylene gas was then admitted to the autoclave in an amount sufficient to raise the internal pressure of the autoclave to 15,000 pounds per square inch. The reaction was allowed to proceed for a period of three hours, at the end of which period, the pressure within the autoclave was reduced to atmospheric pressure, the temperature of the reaction mixture was reduced to room temperature, and the autoclave was opened.

The overall conversion of ethylene monomer to polymer was 42.8 percent. Ten percent of the ethylene polymer was in emulsion, the remainder was in the form of a white granular powder. The total solids content of the polyethylene emulsion was 3.1 percent. The particles were non-uniform in shape many having diameters in excess of 1.0 micron.

This example illustrates the necessity of using a proper combination of surfactants.

*Example 4*

PREPARATION OF ETHYLENE HOMOPOLYMER EMULSION UTILIZING TWO HIGH MICELLE POTENTIAL ANIONIC SURFACTANTS

To a high pressure, stirred autoclave having a 1500 milliliter capacity were charged 750 grams of distilled water, 3 grams of sodium bis(tridecyl)sulfosuccinate, 3 grams of dioctyl ester of sodium sulfosuccinic acid, and 2.5 grams of a 5 percent solution of tert-butyl hydroperoxide in benzene. The autoclave was sealed and thoroughly purged with high purity nitrogen gas. The reaction chamber was then heated to a temperature of 135° C. and ethylene gas was admitted to the autoclave in an amount sufficient to raise the internal pressure of the autoclave to 15,000 pounds per square inch. The reaction was allowed to proceed for a period of 103 minutes at the end of which period the pressure within the autoclave was reduced to atmospheric pressure, the reaction temperature was reduced to room temperature and the autoclave was opened.

The total conversion of ethylene monomer to polymer was 48.3 percent, and only twenty percent of the ethylene polymer was in the product emulsion. The total solids content of the emulsion was 3.6 percent. Similarly this example shows the necessity of using a proper surfactant system.

*Example 5*

PREPARATION OF ETHYLENE HOMOPOLYMER EMULSION UTILIZING A COMBINATION LOW MICELLE POTENTIAL AND PROPER HIGH MICELLE POTENTIAL ANIONIC SURFACTANT

To a high pressure, stirred autoclave having a 1500 milliliter capacity were charged 924 grams of distilled water, 80 grams of a 5 percent aqueous solution of sodium bis(tridecyl)sulfosuccinate, 4 grams of the isopropyl amine salt of dodecylbenzenesulfonic acid, and 5 grams of a 5 percent solution of tert-butyl hydroperoxide in benzene. The autoclave was sealed, thoroughly purged with high purity nitrogen gas, and heated to a temperature of 135° C. Ethylene gas was then admitted to the autoclave in an amount sufficient to raise the internal pressure of the autoclave to 15,000 pounds per square inch and the reaction was allowed to proceed for a period of 72 minutes. At the end of this reaction period, one additional gram of sodium bis(tridecyl)sulfosuccinate and one additional gram of the isopropyl amine salt of dodecylbenzenesulfonic acid were added to the reaction and the reaction was then permitted to proceed for an additional 23 minutes. After this final reaction period the pressure of the autoclave was reduced to atmospheric pressure, the temperature of the reaction mixture was reduced to room temperature and the autoclave was opened. A total of 197 grams of ethylene polymer was recovered, which represented a 45.2 percent conversion of ethylene monomer to polymer. This ethylene polymer had a melt index of 1.8. One hundred percent of this polymer was present in the polyethylene emulsion having a total solids content of 22.7 percent. The particles were uniformly spherical and had diameters less than 1.0 micron.

*Example 6*

PREPARATION OF ETHYLENE HOMOPOLYMER EMULSION UTILIZING A PROPER HIGH AND LOW MICELLE POTENTIAL ANIONIC SURFACTANT COMBINATION

To a high pressure, stirred autoclave having a 1500 milliliter capacity were charged 600 grams of distilled water, 10 grams of sodium bis(tridecyl)sulfosuccinate, 10 grams of the isopropylamine salt of dodecylbenzenesulfonic acid, and 1.5 grams of a 5 percent solution of tert-butyl hydroperoxide in benzene. The autoclave was sealed, thoroughly purged with high purity nitrogen gas, and heated to a temperature of 140° C. Ethylene gas was admitted to the autoclave in an amount sufficient to raise the pressure of the autoclave to 15,000 pounds per square inch and the reaction was allowed to proceed for a period of 180 minutes whereupon 4 grams of sodium bis(tridecyl)sulfosuccinate was added to the reaction mixture. The reaction was then allowed to proceed for an additional period of 274 minutes. When this latter reaction period had elapsed the pressure of the autoclave was reduced to atmospheric pressure, the reaction temperature was reduced to room temperature, and the autoclave was opened.

The polyethylene emulsion recovered weighed 1002 grams and contained 38 percent of emulsified polyethylene.

The ethylene polymer had the following characteristic physical properties:

Stiffness modulus, pounds per square inch _____ 33,000
Tensile strength, pounds per square inch _____ 1,800
Ultimate elongation, percent at 1000 percent per minute _____ 139
Melt index, decigrams/minute _____ 0.76
Density _____ 0.926

After standing for a period of 12 months, the emulsion showed no evidence of creaming or agglomerating.

*Example 7*

PREPARATION OF ETHYLENE HOMOPOLYMER EMULSION HAVING AN EXTREMELY HIGH RESIN CONTENT

To a high pressure, stirred autoclave having a 1500 milliliter capacity were charged 750 grams of distilled water, 14 grams of the isopropylamine salt of dodecylbenzenesulfonic acid, 10 grams of sodium bis(tridecyl)sulfosuccinate and 3 grams of a 5 percent solution of tert-butyl hydroperoxide in benzene. The autoclave was sealed, thoroughly purged with high purity nitrogen gas, and heated to a temperature of 140° C. Ethylene gas was admitted to the autoclave in an amount sufficient to raise the internal pressure of the autoclave to 15,000 pounds per square inch and the reaction was allowed to proceed for a period of 400 minutes. The pressure within the autoclave was reduced to atmospheric pressure, the temperature of the reaction mixture was reduced to room temperature, and the autoclave was opened. A total of 1107 grams of polyethylene emulsion was obtained containing 47.6 percent emulsified polyethylene. The polyethylene had the following characteristic physical properties:

Stiffness modulus, pounds per square inch _____ 24,000
Tensile strength, pounds per square inch _____ 1,600
Ultimate elongation, percent at 1000 percent per minute _____ 216
Melt index, decigrams per minute _____ 0.68
Density _____ 0.920

Example 8
PREPARATION OF ETHYLENE HOMOPOLYMER EMULSION HAVING AN EXTREMELY HIGH RESIN CONTENT To a high pressure stirred autoclave having a 1500 milliliter capacity were charged 550 grams of distilled water, 10 grams of sodium bis(tridecyl)sulfosuccinate, 14 grams of the isopropylamine salt of dodecylbenzesulfonic acid and 4 grams of a 5 percent solution of tert-butyl hydroperoxide in benzene. The autoclave was sealed, thoroughly purged with high purity nitrogen gas and heated to a temperature of 140° C. Ethylene gas was admitted to the autoclave in an amount sufficient to raise the internal pressure of the autoclave to 15,000 pounds per square inch, and the reaction was allowed to proceed for a period of 435 minutes. At the end of this reaction period the pressure within the autoclave was reduced to atmospheric pressure by venting, the temperature of the reaction mixture was reduced to room temperature and the autoclave was opened. A total of 912 grams of polyethylene emulsion was obtained which contained 49.1 percent emulsified polyethylene.

The ethylene polymer had the following characteristic physical properties:

| | |
|---|---|
| Stiffness modulus, pounds per square inch | 25,000 |
| Tensile strength, pounds per square inch | 1,500 |
| Ultimate elongation, percentage at 1000 percent per minute | 120 |
| Melt index, decigrams per minute | 0.19 |
| Density | 0.921 |

After standing for a period of 12 months, the emulsion showed no evidence of creaming or agglomerating.

Example 9
PREPARATION OF ETHYLENE HOMOPOLYMER EMULSION HAVING AN EXTREMELY HIGH RESIN CONTENT To a high pressure, stirred autoclave having a 1500 milliliter capacity were charged 450 grams of distilled water, 10 grams of sodium bis(tridecyl)sulfosuccinate, 14 grams of the isopropylamine salt of dodecylbenzenesulfonic acid and 4 grams of a 5 percent solution of tert-butyl hydroperoxide in benzene. The autoclave was sealed, thoroughly purged with high purity nitrogen gas, and heated to a temperature of 140° C. Ethylene was admitted to the autoclave in an amount sufficient to raise the internal pressure of the autoclave to 15,000 pounds per square inch and the reaction was allowed to proceed for a period of 350 minutes. At the end of this reaction period, the pressure within the autoclave was reduced to atmospheric pressure, the temperature of the reaction mixture was reduced to room temperature, and the autoclave was opened. The polyethylene emulsion was recovered and was found to contain 52.4 percent of emulsified polyethylene.

The ethylene polymer produced had the following characteristic physical properties:

| | |
|---|---|
| Stiffness modulus, pounds per square inch | 23,000 |
| Tensile strength, pounds per square inch | 1,600 |
| Ultimate elongation, percentage at 1000 percent per minute | 366 |
| Melt index, decigrams per minute | 0.72 |
| Density | 0.922 |

This emulsion displayed no evidence of agglomeration or creaming after standing for a period of 12 months.

Examples 10–14

Examples 10 through 14 demonstrate the copolymerization of ethylene with each of the following monomers.

| Comonomer: | Example |
|---|---|
| Vinyl acetate | 10 |
| Acrylic acid | 11 |
| Butyl acrylate | 12 |
| Vinyl chloride | 13 |
| Bicycloheptene | 14 |

In each example (10–14) the following procedure was followed:

To a high pressure, stirred autoclave having a 1500 milliliter capacity were charged 450 grams of distilled water, 10 grams of sodium bis(tridecyl) sulfosuccinate, 14 grams of the isopropylamine salt of dodecylbenzenesulfonic acid, and 0.2 gram of tert-butyl hydroperoxide. The autoclave was then sealed, thoroughly purged with high purity nitrogen gas, and heated to a temperature of 140° C. Various proportions of ethylene and comonomers (as shown below), were admitted to the autoclave in an amount sufficient to raise the internal pressure of the autoclave to 15,000 pounds per square inch and the reaction allowed to proceed for a period of time (shown below). At the end of the reaction period the pressure within the autoclave was reduced to atmospheric pressure, the temperature of the reaction mixture was reduced to room termperature, the autoclave was opened, and the copolymer emulsion was recovered.

The following table shows the reaction conditions for each comonomer reacted and data relative to the resulting copolymer emulsion obtained:

SUMMARY OF RESULTS FOR THE EMULSION COPOLYMERIZATION OF ETHYLENE

| Comonomer | Reaction Time | Percent Comonomer Initially Charged | Percent Comonomer in Copolymer | Percent Conversion of Monomer to Polymer | Percent Resin in Latex |
|---|---|---|---|---|---|
| Vinyl acetate | 5 hrs., 10 min. | 14.2 | 4.1 | 69 | 42 |
| Acrylic acid | 4 hrs., 14 min. | 4.3 | 13 | 62 | 39 |
| Butyl acrylate | 4 hrs., 5 min. | 4.3 | 6.5 | 66 | 46 |
| Vinyl chloride | 5 hrs., 25 min. | 13.5 | 20 | 47 | 32.2 |
| Bicycloheptene | 5 hrs., 25 min. | 14.2 | | 40 | 25.7 |

Example 15
PREPARATION OF ETHYLENE-BICYCLO[2.2.1]HEPT-2-ENE COPOLYMER EMULSION To a high pressure, stirred autoclave having a 1500 milliliter capacity were charged 190 grams of distilled water, 10 grams of sodium bis(tridecyl)sulfosuccinate, 14 grams of the isopropylamine salt of dodecylbenzenesulfonic acid, 0.3 gram of tert-butyl hydroperoxide and 80 grams of bicycloheptene. The autoclave was then sealed, purged with high purity nitrogen gas, and 156 grams of ethylene was added giving the autoclave an internal pressure of 6000 pounds per square inch. The autoclave was heated to a temperature of 140° C. and a sufficient amount of distilled, deoxygenated water was added to bring the internal pressure to 15,000 pounds per square inch. This pressure and temperature were maintained throughout the entire reaction. After the reaction had run for a period of 193 minutes, an additional 0.3 gram of tert-butyl hydroperoxide was added to the reaction under pressure. The reaction was then allowed to continue for an additional period of 60 minutes, after which the autoclave was vented, the temperature of the reaction mixture was reduced to room temperature and the autoclave was opened.

The ethylene-bicyclo[2.2.1]hept-2-ene copolymer emulsion was milk white in appearance and contained 40 percent dispersed copolymer. The copolymer contained approximately 15 percent bicyclo[2.2.1]hept-2-ene and had the following physical properties:

| | |
|---|---|
| Stiffness modulus, pounds per square inch | 8,000 |
| Tensile strength, pounds per square inch | 1,600 |
| Ultimate elongation, percentage at 1000 percent per minute | 890 |
| Melt index, decigrams per minute | 7.7 |
| Density | 0.928 |

*Example 16*

PREPARATION OF ETHYLENE-VINYL ACETATE COPOLYMER EMULSION

To a high pressure, stirred autoclave, having a 1500 milliliter capacity were charged 450 grams of distilled water, 100 grams of vinyl acetate, 12 grams of the isopropylamine salt of dodecylbenzenesulfonic acid, 10 grams of sodium bis(tridecyl)sulfosuccinate, and .03 gram of tert-butyl hydroperoxide. The autoclave was then sealed, thoroughly purged with high purity nitrogen gas, and 400 grams of ethylene gas was added creating an internal autoclave pressure of 5250 pounds per square inch.

A rocker bomb was charged with 298 grams of vinyl acetate, sealed, and pressurized with ethylene at 1650 pounds per square inch. An outlet from this rocker bomb was connected to a high pressure pump and the vinyl acetate-ethylene mixture was continuously fed to the reaction autoclave by means of this pump.

The autoclave was heated to a reaction temperature of 140° C. and a sufficient amount of the vinyl acetate-ethylene mixture was admitted to the autoclave to bring internal autoclave pressure to 15,000 pounds per square inch. The reaction was allowed to run for a period of 93 minutes, at the end of which period the autoclave was vented, the temperature of the reacted mixture was reduced to room temperature and the autoclave was opened.

The ethylene-vinyl acetate copolymer emulsion contained 46 percent dispersed copolymer. The resin contained about 20 percent vinyl acetate and about 80 percent ethylene. The copolymer resin had the following characteristic physical properties:

| | |
|---|---|
| Stiffness modulus, pounds per square inch | 6,000 |
| Tensile strength, pounds per square inch | 520 |
| Ultimate elongation, percentage at 1000 percent per minute | 284 |
| Melt index, decigrams per minute | >10,000 |
| Density | 0.945 |

*Example 17*

PREPARATION OF ETHYLENE HOMOPOLYMER EMULSION

To a high pressure, stirred autoclave having a 1500 milliliter capacity were charged 200 grams of a 5 percent aqueous suspension of sodium bis(tridecyl)sulfosuccinate, 14 grams of isopropylamine salt of dodecylbenzenesulfonic acid, 4 grams of a 5 percent solution of t-butyl hydroperoxide in benzene, and 260 grams of distilled water. The autoclave was then sealed and thoroughly purged with high purity nitrogen gas. The autoclave internal temperature was raised to 140° C. while ethylene gas was pumped in to a pressure of 15,000 pounds per square inch which pressure was periodically re-established through the addition of more ethylene. The reaction was allowed to proceed until the effective take up of the ethylene was 13,000 pounds per square inch at which time the internal temperature of the autoclave was raised to 182° C., which temperature was maintained for a period of six minutes. The autoclave was then cooled and vented; the product emulsion was recovered after venting and cooling the autoclave.

The polyethylene emulsion contained 44 percent by weight polyethylene solids.

*Example 18*

PREPARATION OF ETHYLENE-VINYL ACETATE EMULSION

To a high pressure, stirred autoclave having a 1500 milliliter capacity were charged 100 grams of a 5 percent aqueous suspension of the dioctyl ester of sodium sulfosuccinic acid, 20 grams of the isopropylamine salt of dodecylbenzenesulfonic acid, 305 grams of distilled water, 150 grams of freshly distilled vinyl acetate and 0.2 gram of azo bis(isobutyronitrile). The autoclave was then sealed and purged with high purity nitrogen gas. The internal temperature of the autoclave was raised to 90° C. while ethylene gas was pumped in to a pressure of 15,000 pounds per square inch gauge. The reaction was allowed to proceed for a period of one hour and 27 minutes with ethylene gas being intermittently added to maintain pressure. The autoclave was then cooled and vented; the product consisted of a thick white latex and a white powder. The ethylene/vinyl acetate copolymer which was isolated from the emulsion as a powder was molded into a clear transparent plaque. The molded resin had a tensile strength of 3600 pounds per square inch, a stiffness modulus of 2800 pounds per square inch and a melt index of 0.049. Carbon analysis showed the copolymer to be 27.8 percent vinyl acetate.

*Example 19*

PREPARATION OF ETHYLENE HOMOPOLYMER EMULSION UTILIZING A NON-IONIC LOW MICELLE POTENTIAL SURFACTANT AND AN ANIONIC HIGH MICELLE POTENTIAL SURFACTANT

To a high pressure, stirred autoclave having a 1500 milliliter capacity were charged 0.5 gram of triethyl amine, 10 grams of sodium bis(tridecyl)sulfosuccinate, 4 grams of a 5% solution of tert-butyl hydroperoxide, 15 grams of a non-ionic surfactant which is the condensation product of one mole of a mixture of stearyl and cetyl alcohol, with 6 moles of ethylene oxide, and 500 grams of distilled water. The autoclave was then sealed and thoroughly purged with high purity nitrogen gas. The autoclave was heated to a temperature of 140° C. and ethylene gas was pumped in until the internal pressure equaled 15,000 pounds per square inch. As the reaction occurred, the pressure decreased, but fresh ethylene was added to maintain the pressure at 15,000 pounds per square inch. The reaction was allowed to continue for a period of two hours and forty-three minutes at the end of which time the autoclave was vented and cooled to room temperature.

The product recovered was a fluid white latex emulsion containing 37.9 percent homogeneously dispersed polyethylene resin. This resin was isolated from the emulsion and had the following properties:

| | |
|---|---|
| Melt index, decigrams per minute | 8.04 |
| Density | 0.930 |
| Stiffness modulus, pounds per square inch | 35,000 |
| Tensile strength, pounds per square inch | 1,700 |
| Elongation in percent | 105 |

*Example 20*

PREPARATION OF ETHYLENE-VINYL CHLORIDE COPOLYMER EMULSION HAVING HIGH RESIN CONTENT

To a high pressure, stirred autoclave having a 1500 milliliter capacity were charged 6 grams of an aqueous solution containing 30 percent by weight sodium laurylsulfate, 67 grams of an aqueous solution containing 37 percent by weight of sodium tetra-decyl-sulfate, 1.5 grams of potassium persulfate and 426 grams of distilled deoxygenated water.

The autoclave was then sealed and purged with high purity nitrogen gas, after which 250 grams of vinyl chloride was charged from a gas cylinder. The autoclave was then heated while ethylene gas was pumped in. This continued until the autoclave attained an internal temperature of 70° C. and an internal pressure of 5,000 pounds per square inch. The onset of reaction was detected by a decrease in pressure. The pressure was thereafter maintained at 5,000 pounds per square inch by pumping a mixture of ethylene and vinyl chloride, containing fifty weight percent of each, into the autoclave.

After a period of three hours and forty-nine minutes, the autoclave was vented to a pressure of below 1,000 pounds per square inch and the temperature was reduced to below 40° C. The remaining unreacted monomer was vented and the latex emulsion was recovered by draining from the bottom of the autoclave. The ethylene-vinyl chloride copolymer emulsion was a stable latex and contained 44.6 percent dispersed resin. The ethylene and vinyl chloride copolymer had a reduced viscosity of 0.596 (0.2% solution in cyclohexanone) and contained 81.5 percent by weight of vinyl chloride.

The physical properties of the resin were as follows:

| | |
|---|---|
| Density | 1.29 |
| Stiffness modulus, pounds per square inch | 19,000 |
| Tensile strength, pounds per square inch | 1,300 |
| Elongation, percent | 265 |
| Reduced viscosity (0.2 gram per 100 cc. of cyclohexanone) in centipoises | 0.686 |

*Example 21*

PREPARATION OF ETHYLENE/VINYL FLUORIDE COPOLYMER EMULSION

To a high pressure, stirred autoclave having a 1500 milliliter capacity were charged 200 grams of a 5 percent aqueous solution of sodium bis(tridecyl)sulfosuccinate, 14 grams of the isopropyl amine salt of dodecylbenzenesulfonic acid, and 300 grams of distilled water.

The autoclave was then sealed, purged with high purity nitrogen gas, and 60 grams of vinyl fluoride was added. The temperature of the charged mixture was raised to 135° C. and ethylene gas was force charged until an internal perssure of 15,000 pounds per square inch was attained. 0.2 gram of t-butyl hydroperoxide was then added through the pressure transmitter. The temperature was raised to and maintained at 140°, and the pressure was maintained at 15,000 pounds per square inch for a period of three hours. At the end of this reaction period the autoclave was vented and the ethylene/vinyl fluoride copolymer emulsion was obtained directly. This emulsion contained 45 percent by weight ethylene/vinyl fluoride copolymer having a ratio of ethylene to vinyl fluoride of 92.2 to 7.8. The ethylene/vinyl fluoride copolymer exhibited the following properties:

| | |
|---|---|
| Stiffness modulus, pounds per square inch | 136,000 |
| Tensile strength, pounds per square inch | 3,900 |
| Elongation, percent | 33 |
| Melting point, ° C. | 185 |
| Reduced viscosity in cyclohexanone at a temperature of 140° C. and a concentration of 0.2 gram per 100 cc. | 1.78 |

*Example 22*

PREPARATION OF ETHYLENE HOMOPOLYMER UTILIZING A SURFACTANT SYSTEM OF SODIUM BIS(TRIDECYL)SULFOSUCCINATE AND MORPHOLINE DODECYLBENZENESULFONATE

To a high pressure, stirred autoclave having 1500 milliliters capacity were charged 200 grams of a 5 percent aqueous solution of sodium bis(tridecyl)sulfosuccinate, 14 grams of morpholine dodecylbenzenesulfonate, 260 grams of distilled and deoxygenated water and 5 grams of a 5 percent solution of tert-butyl hydroperoxide in benzene.

The autoclave was then sealed, purged with high purity nitrogen gas. Ethylene gas was pumped into the autoclave to a pressure of 3000 pounds per square inch and the internal temperature of the autoclave was raised to 135° C. Additional ethylene was pumped into the auto- had been attained and the temperature of the reaction was raised to 140° C. This temperature and pressure was maintained for a reaction period of one hour and thirty-three minutes.

The product ethylene homopolymer emulsion was obtained directly from the autoclave after venting. This product emulsion contained 41 percent dispersed ethylene homopolymer.

In a manner similar to that described above ethylene polymer emulsions are obtained by replacing the sodium bis(tridecyl)sulfosuccinate with:
Lithium bis(tridecyl)sulfosuccinate,
Potassium bis(tridecyl)sulfosuccinate,
Ammonium bis(tridecyl)sulfosuccinate.

*Example 23*

PREPARATION OF ETHYLENE/VINYL CHLORIDE/ ACRYLIC ACID TERPOLYMER

To a high pressure, stirred autoclave having a 1500 milliliter capacity were charged 18 grams of sodium tetradecyl sulfate, 480 grams of distilled and deoxygenated water, 2.0 grams of sodium lauryl sulfate and 2.0 grams of potassium persulfate.

A 2700 milliliter rocker bomb was previously charged with 1161 grams of vinyl chloride and ethylene was added to bring the total pressure to 3000 pounds per square inch. The autoclave was heated to an internal temperature of 65° C. and the ethylene/vinyl chloride mixture was pumped from the rocker bomb to a pressure of 5000 pounds per square inch. The reaction was allowed to proceed for a period of three hours and forty-four minutes at the termination of which 10 grams of acrylic acid was transmitted to the autoclave and the reaction was allowed to proceed for an additional period of fifty-five minutes.

The autoclave was then vented and the ethylene/vinyl chloride/acrylic acid terpolymer emulsion was recovered directly. This emulsion contained 23.2 percent dispersed ethylene/vinyl chloride/acrylic acid terpolymer. The purified terpolymer resin was found to contain 67 percent vinyl chloride, 31.1 percent ethylene, and 1.9 percent acrylic acid.

*Example 24*

PREPARATION OF ETHYLENE/ETHYL ACRYLATE COPOLYMER EMULSION

To a high pressure, stirred autoclave having a 1500 milliliter capacity were charged 200 grams of a 5 percent aqueous solution of sodium bis(octyl)sulfosuccinate, 10 grams of the isopropylamine salt of dodecylbenzenesulfonic acid, 310 grams of distilled and deoxygenated water and 9.5 grams of ethyl acrylate.

The autoclave was then purged with high purity nitrogen gas and ethylene gas was pumped in to a pressure of 4000 pounds per square inch. The internal temperature of the autoclave was raised to 85° C. and additional ethylene was pumped in until an autoclave pressure of 15,000 pounds per square inch was obtained. This additional ethylene was treated by passing it through a pressure transmitter previously charged with an aqueous solution containing one gram of methanol and 0.8 gram of potassium thiosulfate. The autoclave temperature was then raised to 90° C.

A rocker bomb having a 2,700 milliliter capacity was previously charged with a mixture of 20 grams of ethyl acrylate and sufficient ethylene gas to bring the total pressure of the bomb to 3000 pounds per square inch. The pressure drop which occurred during reaction in the autoclave was made up by the addition of this ethyl acrylate-ethylene mixture.

The reaction in the autoclave was permitted to run for a period of three hours and fifty minutes at a pressure of 15,000 pounds per square inch and a temperature of 90° C. At the end of this reaction period the autoclave was vented, and the ethylene-ethyl acrylate emulsion was recovered directly. The product emulsion contained 7.0 percent ethylene-ethyl acrylate copolymer. Carbon analysis indicated that the copolymer contained 19.1 percent ethyl acrylate.

*Example 25*

PREPARATION OF ETHYLENE/VINYL ACETATE/ ACRYLIC ACID TERPOLYMER

To a high pressure, stirred autoclave having a 1500 milliliter capacity were charged 200 grams of a five percent aqueous solution of sodium bis(octyl)sulfosuccinate, 10 grams of the isopropylamine salt of dodecylbenzenesulfonic acid, 310 grams of distilled and deoxygenated water, 123 grams of distilled vinyl acetate, and 0.4 gram of potassium persulfate. Ten grams of acrylic acid were charged to the pressure transmitter.

Ethylene gas was pumped into the autoclave to a pressure of 5,000 pounds per square inch and the internal temperature of the autoclave was raised to 85° C. Additional ethylene gas was then pumped to the autoclave and the reaction temperature was raised to 90° C.

Pressure decrease, due to reaction, was compensated for by the periodic addition of ethylene gas to 15,000 pounds per square inch. When the accumulated pressure drop had reached 5000 pounds per square inch the additional ethylene was charged also thereby charging 10 grams of acrylic acid. After an accumulated pressure drop of 6000 pounds per square inch the autoclave was vented and the produced ethylene/vinyl acetate/acrylic acid terpolymer emulsion was recovered directly. This terpolymer emulsion contained 29 percent ethylene/vinyl acetate/acrylic acid terpolymer resin. This resin contained 25 percent vinyl acetate and about 0.1 percent acrylic acid.

*Example 26*

PREPARATION OF POLYETHYLENE EMULSION UTILIZING A SURFACTANT SYSTEM OF SODIUM DODECYLBENZENESULFONATE AND ISOPROPYL AMINE SALT OF DODECYLBENZENESULFONIC ACID

To a high pressure, stirred autoclave were charged 10 grams of sodium dodecylbenzenesulfonate, 450 grams of distilled and deoxygenated water, 0.75 gram of potassium persulfate, and 14 grams of the isopropyl amine salt of dodecylbenzenesulfonic acid.

The autoclave was then sealed, purged with high purity nitrogen gas and heated to a temperature of 85° C. Ethylene gas was added to a pressure of 15,000 pounds per square inch. Ethylene gas was added periodically to maintain the pressure at 15,000 pounds per square inch until an accumulated pressure drop of 2000 pounds per square inch had been reached, at which time the autoclave was vented and the product polyethylene emulsion was collected. This polyethylene emulsion contained 7.0 percent dispersed polyethylene.

*Example 27*

PREPARATION OF POLYETHYLENE EMULSION UTILIZING A SURFACTANT SYSTEM OF SODIUM TETRADECYL SULFATE AND THE ISOPROPYLAMINE SALT OF DODECYLBENZENESULFONIC ACID

This example was conducted identically to Example 26 except that 10 grams of sodium tetradecyl sulfate was used in place of the sodium dodecylbenzenesulfonate and the accumulated pressure drop was 4000 pounds per square inch.

The product polyethylene emulsion contained 22.2 percent dispersed polyethylene.

*Example 28*

PREPARATION OF ETHYLENE/ACRYLIC ACID COPOLYMER

To a high pressure, stirred autoclave having a 1500 milliliter capacity were charged 200 grams of a 5 percent aqueous solution of sodium bis(tridecyl)sulfosuccinate, 14 grams of isopropylamine salt of dodecylbenzenesulfonic acid, 260 grams of distilled and deoxygenated water, and 4 grams of a 5 percent solution of tert-butyl hydroperoxide in benzene. Five grams of glacial acrylic acid was charged to the pressure transmitter.

The autoclave was heated to an internal temperature of 135° C. and ethylene gas was admitted to a pressure of 15,000 pounds per square inch. The reaction proceeded at a temperature of 140° C. and a pressure of 15,000 pounds per square inch for an accumulated pressure drop of 5,000 pounds per square inch. The acrylic acid was then charged to the autoclave under a head of ethylene gas which reestablished the 15,000 pounds per square inch pressure. The reaction was then allowed to proceed until an accumulated pressure drop of 15,000 pounds per square inch had been attained. The autoclave was then vented and the ethylene/acrylic acid copolymer emulsion was recovered directly. This emulsion contained 45 percent dispersed ethylene/acrylic acid copolymer resin which contained 2.36 percent by weight acrylic acid.

*Example 29*

THE CONTINUOUS PREPARATION OF ETHYLENE HOMOPOLYMER EMULSION

A solution containing 18,208 grams of distilled water, 716 grams of sodium bis(tridecyl)sulfosuccinate, 576 grams of the isopropylamine salt of dodecylbenzenesulfonic acid, and 40 grams of potassium persulfate was charged to a feed tank and placed under a nitrogen pressure of 60 pounds per square inch. Four hundred and sixty-five grams of this mixture was charged to a 1500 milliliter, high pressure, stirred autoclave preheated to a temperautre of 150° C. Deoxygenated ethylene was then charged to the autoclave to a pressure of 10,000 pounds per square inch at which point the feed of the above mixture was begun.

From this point on ethylene and the aqueous solution were fed continuously while the polyethylene emulsion was removed continuously from the autoclave. The operating pressure was 11,200 pounds per square inch, the operating temperature was 150° C. and the weight ratio of ethylene to water was 1.23 while the space velocity of the total feed was 90 pounds per hour per cubic foot of reactor volume.

The reaction was continued for a period of 9 hours. The polyethylene homopolymer emulsion obtained was fluid and stable, and contained 37.4 percent dispersed polyethylene.

What is claimed is:

1. A process for producing a stable ethylene polymer latex characterized by relatively spherical particles having a diameter of from 0.01 to 2.0 microns which process comprises subjecting a polymerizable mass of non-aromatic, mono-olefinically unsaturated, polymerizable monomer containing from 5 to 100 percent ethylene monomer therein to a temperature of from 50° C. to 250° C., at a pressure of from about 1000 pounds per square inch to about 50,000 pounds per square inch, with the proviso that a pressure of at least 8,000 pounds per square inch is employed in preparing ethylene homopolymer, in an aqueous media containing (1) a water-soluble free-radical catalyst; (2) a surfactant selected from the group consisting of (a) amine salts of alkyl aryl sulfonates containing from 12 to 30 carbon atoms inclusive and having a micelle potential of less than 10 and (b) oil-soluble non-ionic surfactants of the formula:

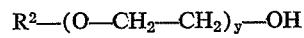

$$R^2-(O-CH_2-CH_2)_y-OH$$

wherein $R^2$ is a monovalent aliphatic hydrocarbon radical containing from 10 to 20 carbon atoms and $y$ is an integer having a value of from 1 to 6 inclusive; and (3) a high micelle potential anionic surfactant, having a micelle potential of from 10 to 40 inclusive, of the formula:

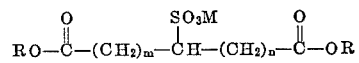

wherein R is an alkyl group containing from 7 to 20 carbon atoms inclusive, $m$ is a digit having a value of from 1 to 3 inclusive, $n$ is a digit having a value of from 0 to 3 inclusive, and M is a monovalent cation having a molecular weight of from 2 to 40 inclusive, with the proviso that when the polymerization temperature used is in excess of 100° C. the high micelle potential anionic surfactant employed has a micelle potential of from 20 to 40.

2. The process of claim 1 wherein the anionic surfactant having a micelle potential of from 10 to 40 inclusive is a bis(alkyl)sulfosuccinate monovalent salt having the formula:

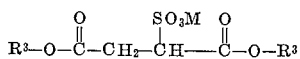

wherein each $R^3$ is an alkyl group containing from 7 to 20 carbon atoms inclusive and M is a monovalent cation having a molecular weight of from 2 to 40 inclusive.

3. The process of claim 1 wherein the amine salt of an alkyl aryl sulfonate is the isopropylamine salt of dodecylbenzenesulfonic acid.

4. The process of claim 1 wherein the anionic surfactant having a micelle potential of from 10 to 40 inclusive is sodium bis(tridecyl)sulfosuccinate.

5. The process of claim 1 wherein the non-aromatic polymerizable monomer is a mixture of ethylene and acrylic acid.

6. The process of claim 1 wherein the non-aromatic polymerizable monomer is a mixture of ethylene and bicyclo[2.2.1]hept-2-ene.

7. The process of claim 1 wherein the non-aromatic polymerizable monomer is a mixture of ethylene and vinyl acetate.

8. The process of claim 1 wherein the non-aromatic polymerizable monomer is a mixture of ethylene and vinyl chloride.

9. The process of claim 1 wherein the non-aromatic polymerizable monomer is a mixture of ethylene, vinyl chloride, and acrylic acid.

10. The process of claim 1 wherein the non-aromatic polymerizable monomer is a mixture of ethylene, vinyl acetate and acrylic acid.

11. The process of claim 1 wherein the non-aromatic polymerizable monomer is a mixture of ethylene and vinyl fluoride.

References Cited by the Examiner

UNITED STATES PATENTS

| 2,342,400 | 2/1944 | Hopff et al. | 260—29.6 |
|---|---|---|---|
| 2,592,526 | 4/1952 | Seed | 260—94.9 |
| 2,655,496 | 10/1953 | Adams | 260—85.5 |
| 3,226,375 | 12/1965 | Greth et al. | 260—93.5 |

FOREIGN PATENTS 578,584   7/1946   Great Britain.

MURRAY TILLMAN, *Primary Examiner.*

W. J. BRIGGS, Sr., N. OBLON, *Assistant Examiners.*